US010055754B2

(12) United States Patent
Brown et al.

(10) Patent No.: US 10,055,754 B2
(45) Date of Patent: Aug. 21, 2018

(54) SYSTEMS AND METHODS FOR TRACKING APPLICATION INSTALLS THAT DISTINGUISH NEW USERS FROM EXISTING USERS WITHOUT DIRECTLY ACCESSING USER ACCOUNT RECORDS

(71) Applicant: Tune, Inc., Seattle, WA (US)

(72) Inventors: Lucas Brown, Seattle, WA (US); Niek Sanders, Seattle, WA (US)

(73) Assignee: TUNE, Inc., Seattle, WA (US)

( * ) Notice: Subject to any disclaimer, the term of this patent is extended or adjusted under 35 U.S.C. 154(b) by 148 days.

(21) Appl. No.: 14/657,981

(22) Filed: Mar. 13, 2015

(65) Prior Publication Data

US 2015/0262224 A1 Sep. 17, 2015

Related U.S. Application Data

(60) Provisional application No. 61/952,826, filed on Mar. 13, 2014, provisional application No. 61/952,787, filed on Mar. 13, 2014.

(51) Int. Cl.
*G06F 11/34* (2006.01)
*G06Q 30/02* (2012.01)
*G06F 8/61* (2018.01)

(52) U.S. Cl.
CPC ..... *G06Q 30/0246* (2013.01); *G06F 11/3438* (2013.01); *G06F 8/61* (2013.01)

(58) Field of Classification Search
CPC .... G06Q 30/0246; G06F 11/3438; G06F 8/61
See application file for complete search history.

(56) References Cited

U.S. PATENT DOCUMENTS 6,151,643 A * 11/2000 Cheng ................ G06F 8/62
709/200
6,345,386 B1 2/2002 Delo
(Continued)

FOREIGN PATENT DOCUMENTS

JP 2011-186825 A 9/2011
JP 2013-080319 A 5/2013
(Continued)

OTHER PUBLICATIONS

Web archive created Dec. 14, 2012, of Brown, L., "Unique Identifiers for Attribution," <http://web.archive.org/web/20121214075637/http://support.mobileapptracking.com/entries/22541461-unique-identifiers-for-attribution> [retrieved Mar. 10, 2015], 3 pages.
(Continued)

*Primary Examiner* — Tri Tran
(74) *Attorney, Agent, or Firm* — John W. Branch; Lowe Graham Jones PLLC

(57) ABSTRACT

In some embodiments, a tracking system is provided for providing credit to advertisers for application installs and in-application events. The tracking system may be configured to use user account information from a content provider system to determine whether a user of a newly installed application is a new user of the content provider system or an existing user of the content provider system, and to update tracking information accordingly. The tracking system may also use the user account information from the content provider system to link actions on multiple computing devices for the purposes of attributing a given application install to one or more advertising providers.

22 Claims, 12 Drawing Sheets

(56) References Cited

U.S. PATENT DOCUMENTS

| | | | |
|---|---|---|---|
| 2006/0178971 A1* | 8/2006 | Owen | G06Q 40/00 |
| | | | 705/35 |
| 2010/0198680 A1 | 8/2010 | Ma | |
| 2011/0270673 A1 | 11/2011 | Lin | |
| 2012/0036003 A1 | 2/2012 | Tong | |
| 2012/0066066 A1 | 3/2012 | Jain | |
| 2012/0278182 A1 | 11/2012 | Kamath | |
| 2012/0278186 A1 | 11/2012 | Hayton | |
| 2012/0278722 A1* | 11/2012 | Raleigh | H04L 12/14 |
| | | | 715/735 |
| 2013/0014136 A1* | 1/2013 | Bhatia | H04N 21/252 |
| | | | 725/9 |
| 2013/0041748 A1 | 2/2013 | Hsiao | |
| 2013/0097008 A1 | 4/2013 | Kaniel | |
| 2013/0325573 A1 | 12/2013 | Park | |
| 2014/0019253 A1 | 1/2014 | Ricasata | |
| 2014/0019266 A1 | 1/2014 | Stoliartchouk | |
| 2014/0188980 A1 | 7/2014 | Longhenry | |
| 2014/0200991 A1 | 7/2014 | Wu | |
| 2014/0289761 A1 | 9/2014 | Weinberger | |

FOREIGN PATENT DOCUMENTS

| | | |
|---|---|---|
| KR | 10-0728937 B1 | 6/2007 |
| KR | 10-0928198 B1 | 11/2009 |

OTHER PUBLICATIONS

International Search Report dated Dec. 9, 2014, issued in International Application No. PCT/US2014/042415, filed Jun. 13, 2014, 4 pages.

"Keep Learning: Launch Android App From Web Link in Browser," Mar. 26, 2014, <http://lansnote.blogspot.com/2014/03/launch-android-app-from-web-link-in.html> [retrieved Mar. 3, 2015], 2 pages.

* cited by examiner

| ACTION | INSTALL? | EVENT? | EXISTING USER? |
|---|---|---|---|
| FIRST APP OPEN (INSTALL) | 1 | 0 | 0 |
| LOGIN | 0 | 0 | 0 |

*Fig. 5A*

| ACTION | INSTALL? | EVENT? | EXISTING USER? |
|---|---|---|---|
| FIRST APP OPEN (INSTALL) | 1 | 0 | 0 |
| LOGIN | 0 | 1 | 0 |

*Fig. 5B*

| ACTION | INSTALL? | EVENT? | EXISTING USER? |
|---|---|---|---|
| FIRST APP OPEN (INSTALL) | 1 | 0 | 0 |
| LOGIN | 0 | 1 | 1 |

*Fig. 5C*

| ACTION | INSTALL? | EVENT? | EXISTING USER? |
|---|---|---|---|
| FIRST APP OPEN (INSTALL) | 1 | 0 | 1 |
| LOGIN | 0 | 1 | 1 |

*Fig. 5D*

|  | CLICKS | INSTALLS | EXISTING USERS | NEW USERS |
| --- | --- | --- | --- | --- |
| PUBLISHER ONE | 1000 | 100 | 70 | 30 |
| PUBLISHER TWO | 2000 | 400 | 100 | 300 |
| PUBLISHER THREE | 3000 | 500 | 250 | 250 |

*Fig. 6A*

|  | CLICKS | INSTALLS | EXISTING USER % | NEW USER % |
| --- | --- | --- | --- | --- |
| PUBLISHER ONE | 1000 | 100 | 70% | 30% |
| PUBLISHER TWO | 2000 | 400 | 25% | 75% |
| PUBLISHER THREE | 3000 | 500 | 50% | 50% |

*Fig. 6B*

|  | EXISTING USER | INSTALLS | RPI 30 | RPI 60 |
| --- | --- | --- | --- | --- |
| PUBLISHER ONE | YES | 70 | $2.50 | $5.00 |
| PUBLISHER ONE | NO | 30 | $1.50 | $3.00 |
| PUBLISHER TWO | YES | 100 | $2.00 | $5.00 |
| PUBLISHER TWO | NO | 300 | $1.00 | $2.00 |
| PUBLISHER THREE | YES | 250 | $4.00 | $10.00 |
| PUBLISHER THREE | NO | 250 | $3.00 | $6.00 |

*Fig. 6C*

SYSTEMS AND METHODS FOR TRACKING APPLICATION INSTALLS THAT DISTINGUISH NEW USERS FROM EXISTING USERS WITHOUT DIRECTLY ACCESSING USER ACCOUNT RECORDS

CROSS-REFERENCES TO RELATED APPLICATIONS

This application claims the benefit of Provisional Application No. 61/952,826, filed Mar. 13, 2014, and Provisional Application No. 61/952,787, filed Mar. 13, 2014, the entire disclosures of which are hereby incorporated by reference herein for all purposes.

BACKGROUND

Tracking technology may be used to track end user behavior for the purposes of providing compensation to third parties and/or providing analytics to advertisers. Such analytics may be used to target advertising and/or help determine the effectiveness of particular advertising campaigns, advertisement publishers, and/or advertising networks. If the subject matter of the advertisement is a software application, it is particularly useful to know if a user who clicked on the advertisement for the software application also downloaded and installed the software application. It is also useful to know how the end user uses the software application.

Unfortunately, currently available methods of tracking downloads, installations, and usage of a software application by a user of an end user computing device are technically inadequate. Some methods require the storage of a cookie on the device and/or using JavaScript code to interrogate the user's device. U.S. Patent Publication No. 2012/0278186 describes one such exemplary method. Technical difficulties arise when attempting to use such a method on an end user computing device such as an iPhone, an Android Phone, a Windows Phone, and/or other types of smartphones. For example, most such end user computing devices "sandbox" each application, thereby preventing applications from storing persistent data accessible to other applications on the same device. Many end user computing devices may also limit the execution of executable code such as JavaScript that is downloaded by a web browser or other advertisement displaying application.

While these limitations on accessing device functionality can improve the security and privacy of end user computing devices, they make it technically challenging for legitimate actors to track end user behavior. For example, a first application may be prevented from storing information about a clicked advertisement on the end user computing device in a way that a second application publicized in the advertisement and later installed or executed can access. Accordingly, tracking functionality included in the second application has no way of obtaining information from local storage regarding the advertisement that led to its install or execution.

Methods of tracking end user clicks and matching them to subsequent application installations (and usage) that avoid using cross-application or inter-process communication on the end user computing device and/or using executable code downloaded with an advertisement to interrogate the user's device are desirable.

Further, many users do not exclusively interact with advertisers via a single end user computing device. For example, many advertisers provide the ability for their customers/users to interact with them via both a first end user computing device that presents a traditional web page and separately via a second end user computing device that executes a mobile application.

For example, a user may be a loyal user of a retail department store website from their desktop computer. A retail department store is used herein as an example advertiser, but could stand in for any other type of business that tracks their advertising using a tracking system. The retail department store may want to encourage users to install their mobile app on their mobile computing device so they can engage with them more, and so that the users may have a better experience when interacting with them via their mobile computing devices than by displaying the desktop website via a mobile browser. Accordingly, the retail department store may present ads on their desktop website (or via one or more ad publishers) that recommend for them to install their mobile application.

Subsequently, the user could go to the app store on their desktop computing device, and the app would then be pushed to their mobile computing device. The user may be directed to the app store by the advertisement by clicking a tracking link to the app store associated with the advertisement. Alternatively, from their mobile computing device, the user could simply use the app store and directly install the mobile app using the mobile computing device. If the user does interact with the ad on the desktop computer but then uses the app store on the mobile computing device to install the application, previously disclosed tracking systems would not be able to attribute the install back to the publisher of the ad presented on the desktop (cross device attribution). Technical problems exist in that the existing tracking systems do not have access to the information required to associate the install of the application on the mobile computing device to the advertisements presented on the desktop computing device.

Another common scenario is that the retail department store discussed above may wish to start acquiring users via advertising for their mobile app. A portion of the users that would be encouraged to install the mobile app in response to the advertising campaigns may already be loyal users of the website, and thus existing users for the company. Existing systems for tracking advertising performance and application installs do not allow for the separate tracking of installations for users who previously had user accounts with a content provider versus installations for users who are new to the content provider, because only the content provider (and not the tracking systems) have had access to user account record data for the content provider.

The present application provides these and other advantages as will be apparent from the following detailed description and accompanying figures.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a system is provided comprising a content provider system, a tracking system, a first end user computing device, and a second end user computing device. The content provider system is for providing digital content and comprises an account data store configured to store a plurality of user account records. The tracking system comprises a tracking data store and at least one computing device configured to provide a tracking engine. The tracking data store is configured to store a plurality of install records and a plurality of login event records. The tracking engine is configured to create and update records stored in the tracking data store. The first end user computing device comprises a web browser that is configured to access a web interface of the content provider system using a first user account associated with a first user account record of the plurality of user account records. The second end user computing device comprises a content provider application. The content provider application is configured to transmit a registration request to the content provider system to create a new user account, receive a registration response from the content provider system, the registration response including an indication of whether the new user account is associated with the first user account, and transmit a login event notification to the tracking engine, the login event notification including the indication of whether the new user account is associated with the first user account.

In some embodiments, a computer-implemented method for a tracking system to use information from an account data store of a content provider system separate from the tracking system to determine whether a user registration within an application executing on a mobile computing device represents a new user or an existing user of the content provider system is provided. The mobile computing device transmits an account access request to the content provider system to access a user account using the application. The mobile computing device receives an account access response from the content provider system, wherein the account access response indicates whether the user account is associated with an existing account in the content provider system. The mobile computing device transmits a login event notification to the tracking system, the login event notification indicating whether the user account already existed in the content provider system.

In some embodiments, a non-transitory computer-readable medium is provided. The computer-readable medium has computer-executable instructions stored thereon that, in response to execution by one or more processors of a mobile computing device, cause the mobile computing device to perform actions comprising transmitting an install notification to a tracking system indicating that an application associated with a content provider system was installed, the install notification including device identifying information; transmitting, using the application, an account creation request to the content provider system to create a new user account within the content provider system; receiving an account creation response from the content provider system, wherein the response includes an indication of whether the new user account is associated with an existing user account; and transmitting a login event notification to a tracking system separate from the content provider system, wherein the login event notification indicates whether the new user account is associated with an existing user account.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 5A-5D are charts that illustrates examples of data that may be collected and stored by embodiments of the tracking system according to various aspects of the present disclosure;

FIGS. 6A-6C are charts that illustrate examples of information provided in summary reports that may be generated by some embodiments of the tracking system according to various aspects of the present disclosure.

DETAILED DESCRIPTION

In some embodiments of the present disclosure, a tracking system is provided that provides cross-device attribution. That is, advertisements for an application presented to a user on a first end user computing device may be used to attribute an installation of the application on a second end user computing device. This is despite the technical challenge of the first end user computing device and the second end user computing device not communicating any tracking-related information to each other.

Further, in some embodiments of the present disclosure, the tracking system is capable of distinguishing application installations associated with new users of a content provider system versus application installations associated with existing users of the content provider system. This is despite the technical challenge that arises because the user account information, the advertisement, and the application install may all be stored on different computing devices that do not directly communicate tracking-related information to each other, and the further technical challenges that arise due to the lack of availability of cross-process communication and persistent storage on the end user computing device installing the application.

Tracking System Overview

Figure 1:
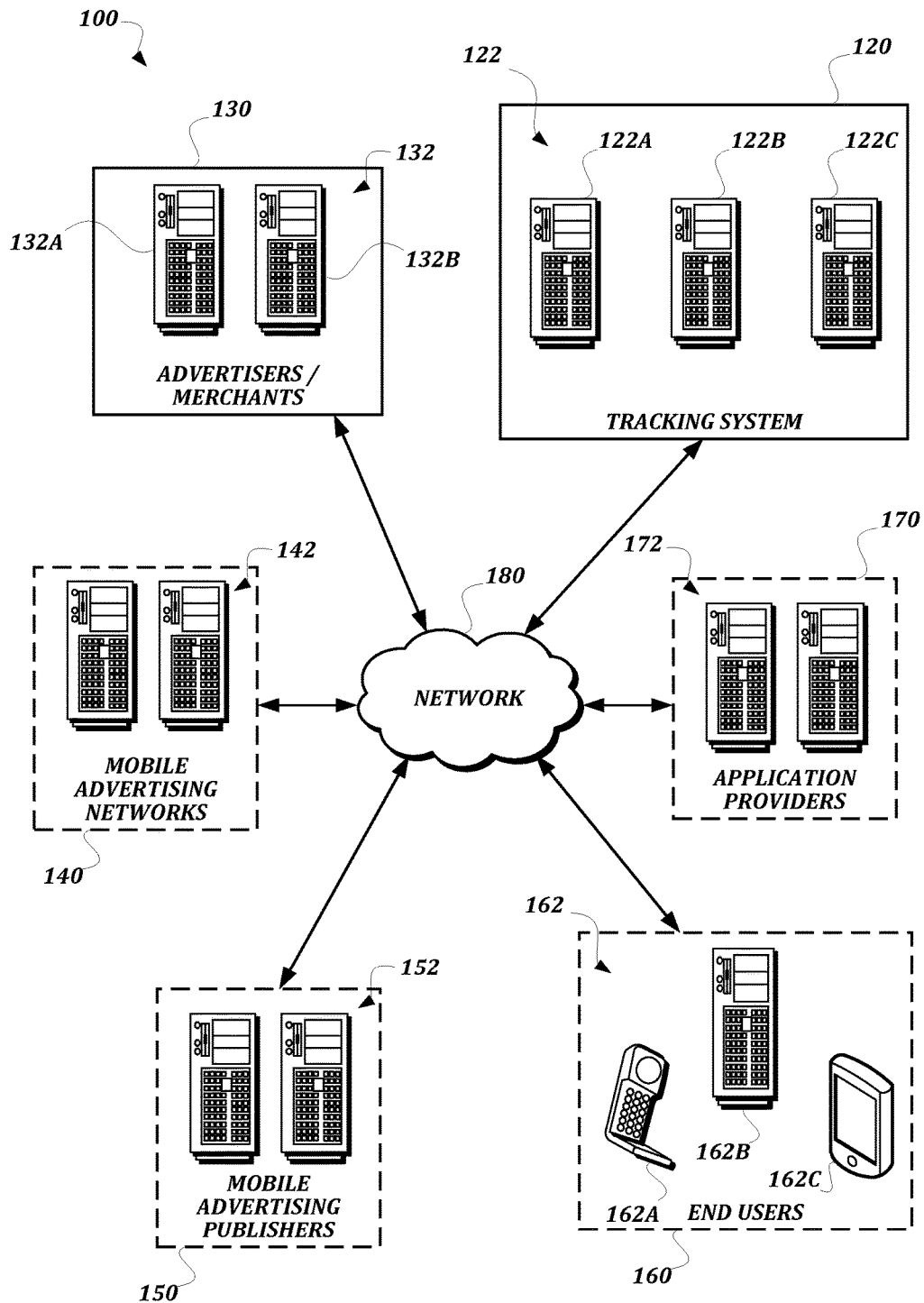
FIG. 1 is a block diagram that illustrates an exemplary embodiment of a system configured to enable the tracking of user actions and to attribute the actions to the appropriate party or parties that encouraged the action, according to various aspects of the present disclosure.

FIG. 1 is a block diagram that illustrates an exemplary embodiment of a system 100 configured to enable the tracking of user actions and to attribute the actions to the appropriate party or parties that encouraged the action, according to various aspects of the present disclosure. One of ordinary skill in the art will note that the system 100 overcomes many technical challenges in tracking user actions, including but not limited to the technical challenge of properly attributing actions that occurred on multiple end user computing devices, the technical challenge of properly attribution actions to parties who distributed and/or displayed advertisements without relying on cross-process or cross-application communication on any given end user computing device, and the technical challenge of augmenting tracking data using account information from a content provider system without directly accessing the content provider system.

Turning to FIG. 1, the system 100 includes a tracking system 120. The tracking system 120 includes one or more computing devices 122. In the embodiment illustrated, the computing devices 122 include a tracking server 122A, a storage service server 122B, and a management interface server 122C. In alternate embodiments, the computing devices 122 may include multiple tracking servers, multiple storage service servers, and/or multiple management interface servers. In some embodiments, the storage service server 122B is external to (and optionally remote from) the tracking system 120. In other embodiments, the functionality of the tracking server 122A and the storage service server 122B may be combined on a single computing device (not shown). In some embodiments, the functionality of the tracking server 122A and the management interface server 122C may be combined on a single computing device (not shown). The tracking system 120 is not limited to the use of a particular number of computing devices to implement the functionality of the tracking server 122A, the storage service server 122B, and the management interface server 122C.

Figure 2A:
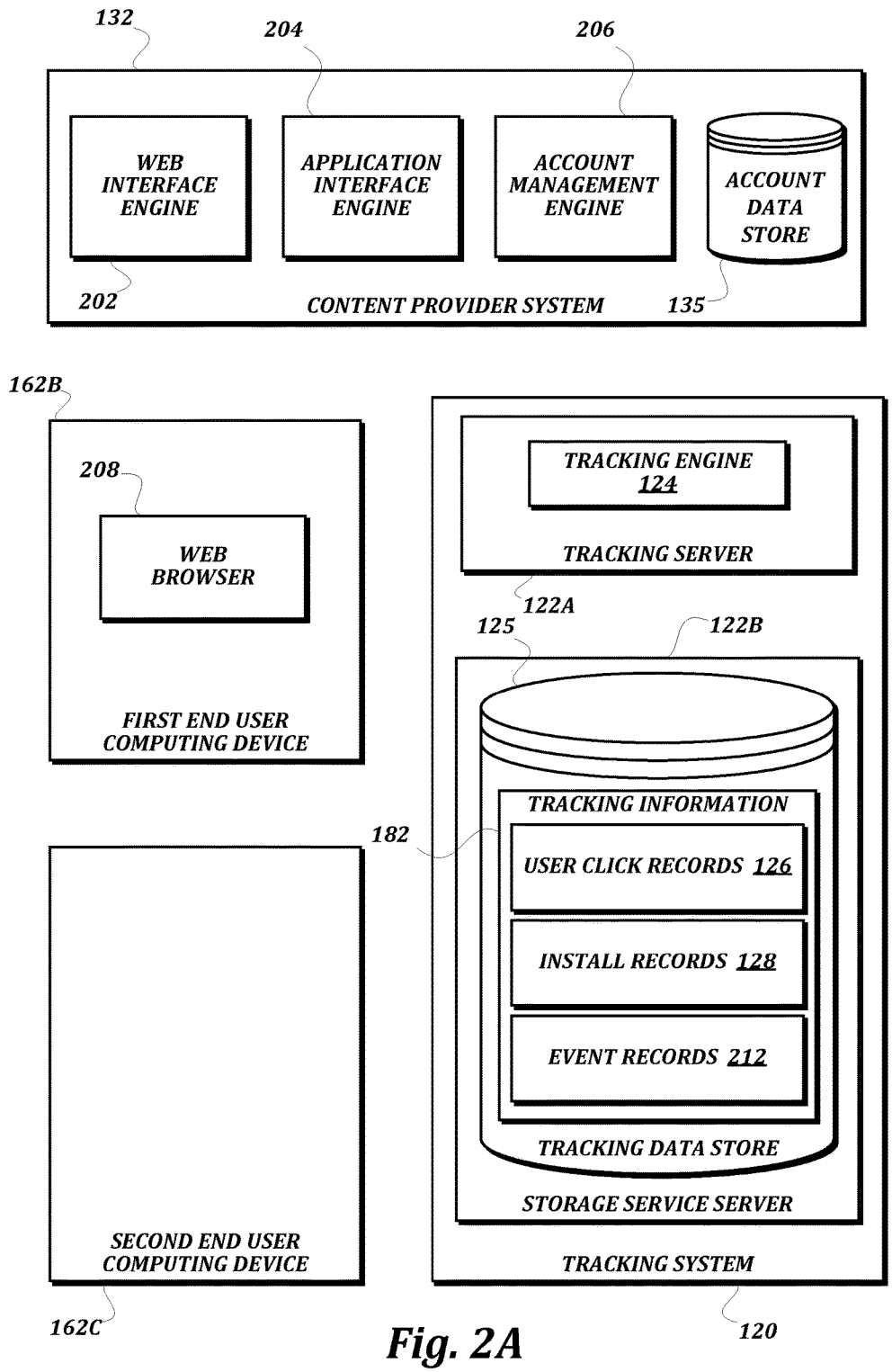
FIGS. 2A and 2B are block diagrams that illustrate further details of various components of the system illustrated in FIG. 1.

Turning to FIG. 2A, the tracking server 122A is configured to provide a tracking engine 124 that communicates with the storage service server 122B. In general, the term "engine" as used herein refers to logic embodied in hardware or software instructions, which can be written in a programming language, such as C, C++, COBOL, JAVA™, PHP, Perl, HTML, CSS, JavaScript, VBScript, ASPX, Microsoft .NET™ languages such as C#, and/or the like. An engine may be compiled into executable programs or written in interpreted programming languages. Software engines may be callable from other engines or from themselves. Generally, the engines described herein refer to logical modules that can be merged with other engines or applications, or can be divided into sub-engines. The engines can be stored in any type of computer readable medium or computer storage device and be stored on and executed by one or more general purpose computers, thus creating a special purpose computer configured to provide the engine.

The storage service server 122B is configured to provide a tracking data store 125 that stores tracking information 182 received from the tracking server 122A and/or the management interface server 122C. The tracking information 182 includes a plurality of user click records 126, one or more application installation records 128, and one or more event records 212. As understood by one of ordinary skill in the art, a "data store" as described herein may be any suitable device configured to store data for access by a computing device. One example of a data store is a highly reliable, high-speed relational database management system (DBMS) executing on one or more computing devices and accessible over a high-speed network. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, as described further below. One of ordinary skill in the art will recognize that separate data stores described herein may be combined into a single data store, and/or a single data store described herein may be separated into multiple data stores, without departing from the scope of the present disclosure.

In some embodiments, each of the user click records 126 includes a site ID value (or a package name value and/or other application identifying information) and device information. Similarly, each of the application installation records 128 and event records 212 also includes a site ID value (or a package name value and/or other application identifying information) and device information. The application identifying information such as the site ID value and the package name value each identify the application 210 for which advertising performance is being tracked (see FIG. 2B). The device information includes at least one device identifier and/or other information associated with one of the computing devices 162 (see FIG. 1).

The device identifiers may be assigned to the computing devices 162 to uniquely identify the computing devices 162. Examples of device identifiers include, but are not limited to, a media access control ("MAC") Address, an International Mobile Station Equipment Identity ("IMEI"), a Mobile Equipment Identifier ("MEID"), an Identifier for Advertising ("IFA"), an Identifier for Vendor ("IFV"), an Android ID, an Open Device Identification Number ("ODIN"), an Open Unique Device Identifier ("Open UDID"), combinations thereof, and the like. By way of a non-limiting example, the IMEI may be an Android IMEI. By way of another non-limiting example, the MEID may be an Android MEID. The other information associated with one of the computing devices 162 (see FIG. 1) may include an Internet Protocol ("IP") Address, browser information (e.g., browser type, browser version, etc.), combinations thereof, and the like. The other information may be usable to identify a computing device 162, though the other information may be less reliable for uniquely identifying a computing device 162 than the device identifiers. Optionally, all or a portion of the device information may be hashed instead of being stored directly in plain text in the tracking information 182. In some embodiments, the user click records 126, the install records 128, and/or the event records 212 may also include user identifiers associated with user account records in the content provider system 132, as discussed further below.

The tracking engine 124 may use the tracking data store 125 to store the user click records 126, the application installation records 128, and/or the event records 212.

Referring to FIG. 1, the system 100 includes one or more computing devices 132 operated by one or more Advertisers/Merchants 130, one or more computing devices 142 operated by one or more Mobile Advertising Networks 140, one or more computing devices 152 operated by one or more Mobile Advertising Publishers 150, a plurality of computing devices 162 operated by a plurality of End Users 160, and one or more computing devices 172 operated by one or more Application Providers 170.

As is apparent to those of ordinary skill in the art, a single entity may function as one of the Advertisers/Merchants 130, one of the Mobile Advertising Networks 140, and one of the Mobile Advertising Publishers 150. Such an entity may operate one or more computing devices (not shown) that perform the functions of the computing devices 132, 142, and 152.

The Advertisers/Merchants 130 include companies that wish to advertise products (e.g., software applications) and/or services. As is apparent to those of ordinary skill in the art, to receive some services, the computing devices 162 may be required to install one or more software applications.

The Mobile Advertising Networks 140 include companies that help distribute advertisements for the Advertisers/Merchants 130 for presentation to end users. The Mobile Advertising Networks 140 may provide services to Mobile Advertising Publishers 150 that allow Mobile Advertising Publishers 150 to present advertisements received from the Mobile Advertising Networks 140 to end users. Non-limiting examples of such companies include Google (the AdWords platform), Apple (the iAd platform), Millennial Media, Tapjoy, InMobi, Advertising.com, AdColony, Jumptap, Nexage, and the like.

The Mobile Advertising Publishers 150 include providers of web sites and mobile applications that display advertisements. Non-limiting examples of such companies include Pandora, Spotify, Facebook, Twitter, Bittorrent.com, The Weather Channel, and any other application or website provider that displays advertisements. In some embodiments, a company may act as both a Mobile Advertising Network 140 and a Mobile Advertising Publisher 150.

The End Users 160 include people who use the computing devices 162 and interact with advertisements, such as those created by the Advertisers/Merchants 130, distributed by the Mobile Advertising Networks 140, and/or displayed by the Mobile Advertising Publishers 150. The End Users 160 also use the computing devices 162 to purchase, download, install, and/or interact with applications provided by the Application Providers 170.

The Application Providers 170 include companies that provide installable applications (such as those advertised by the Advertisers/Merchants 130) to the End Users 160. Non-limiting examples of such companies include "app stores," such as iTunes App Store, Google Play, Amazon Appstore, and the like. The one or more computing devices 172 may be configured to generate a download page (not shown) from which an application may be purchased, downloaded, and/or installed. The download page may be implemented as a webpage.

The computing devices 122, 132, 142, 152, 162, and 172 are connected to one another by a network 180 (e.g., the Internet). Each of the computing devices 122, 132, 142, 152, 162, and 172 may be implemented using a computing device similar to the computing device 12 illustrated in FIG. 7 and described below. By way of non-limiting examples, the computing devices 162 have been illustrated as including a cellular telephone or smartphone 162A, a personal computer 162B (e.g., a desktop computer), and a tablet computer 162C. Each of the computing devices 162 may be configured to implement an advertisement displaying application, such as an Internet browser application, and/or a different application configured to display advertisements. In some embodiments, the advertisement displaying application is different from the Internet browser application. However, this is not a requirement. In some embodiments, the advertisement displaying application is the Internet browser application.

Figure 3A:
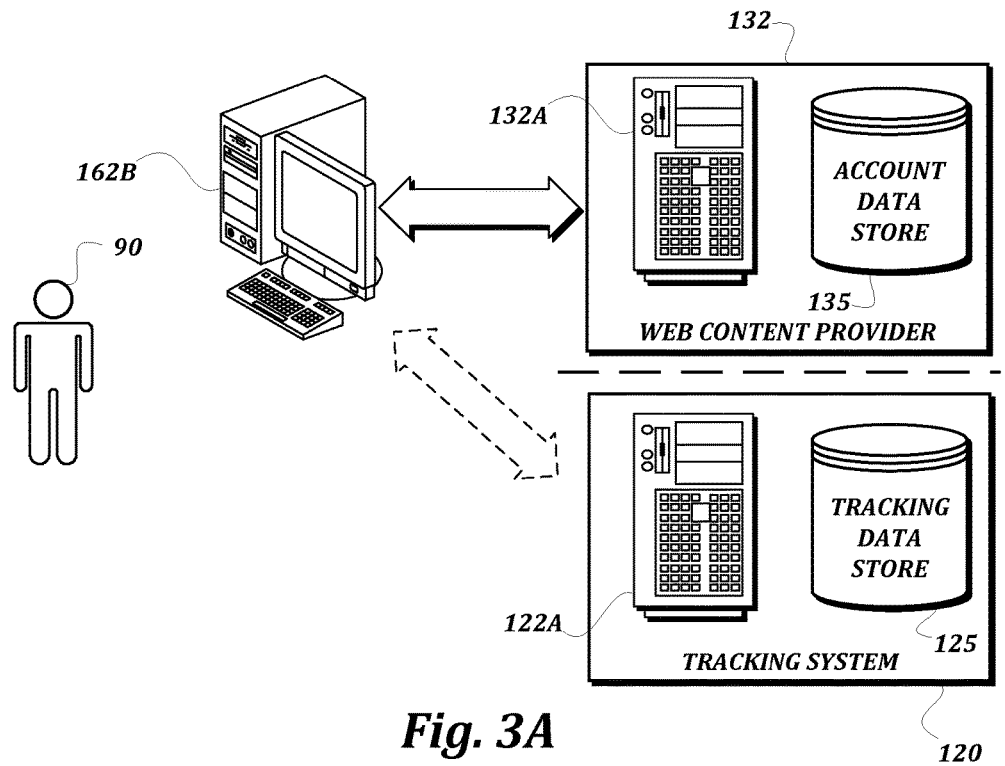
FIGS. 3A and 3B are schematic diagrams that illustrate technical restrictions on communication that are overcome by embodiments of the present disclosure.
Figure 3B:
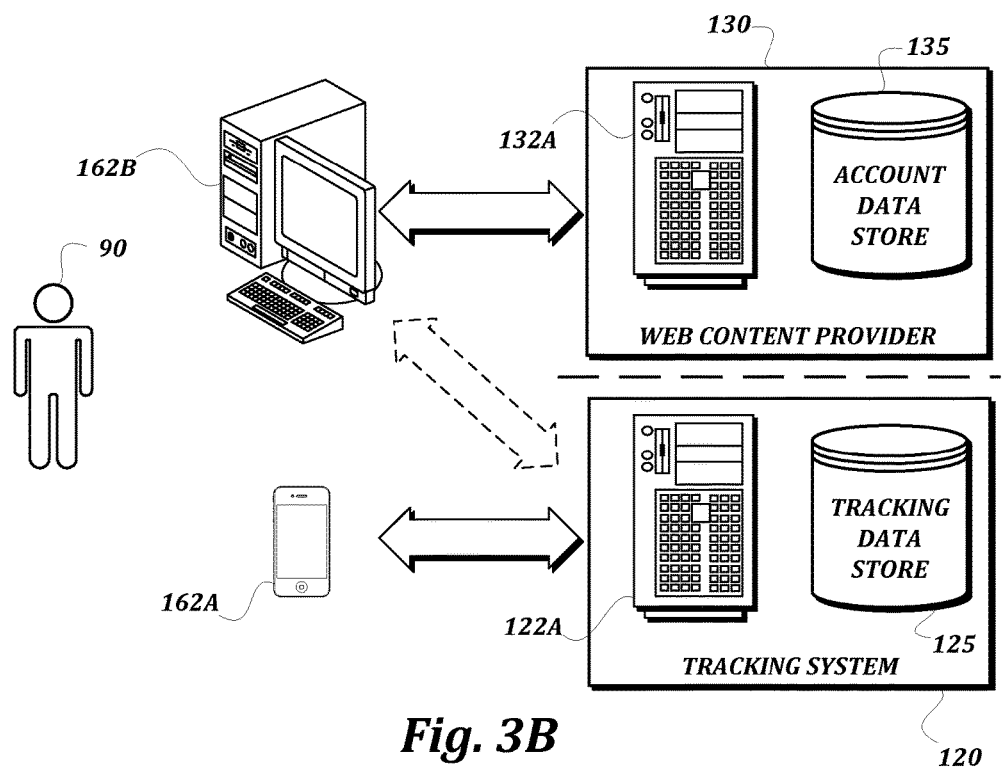
Figure 4A:
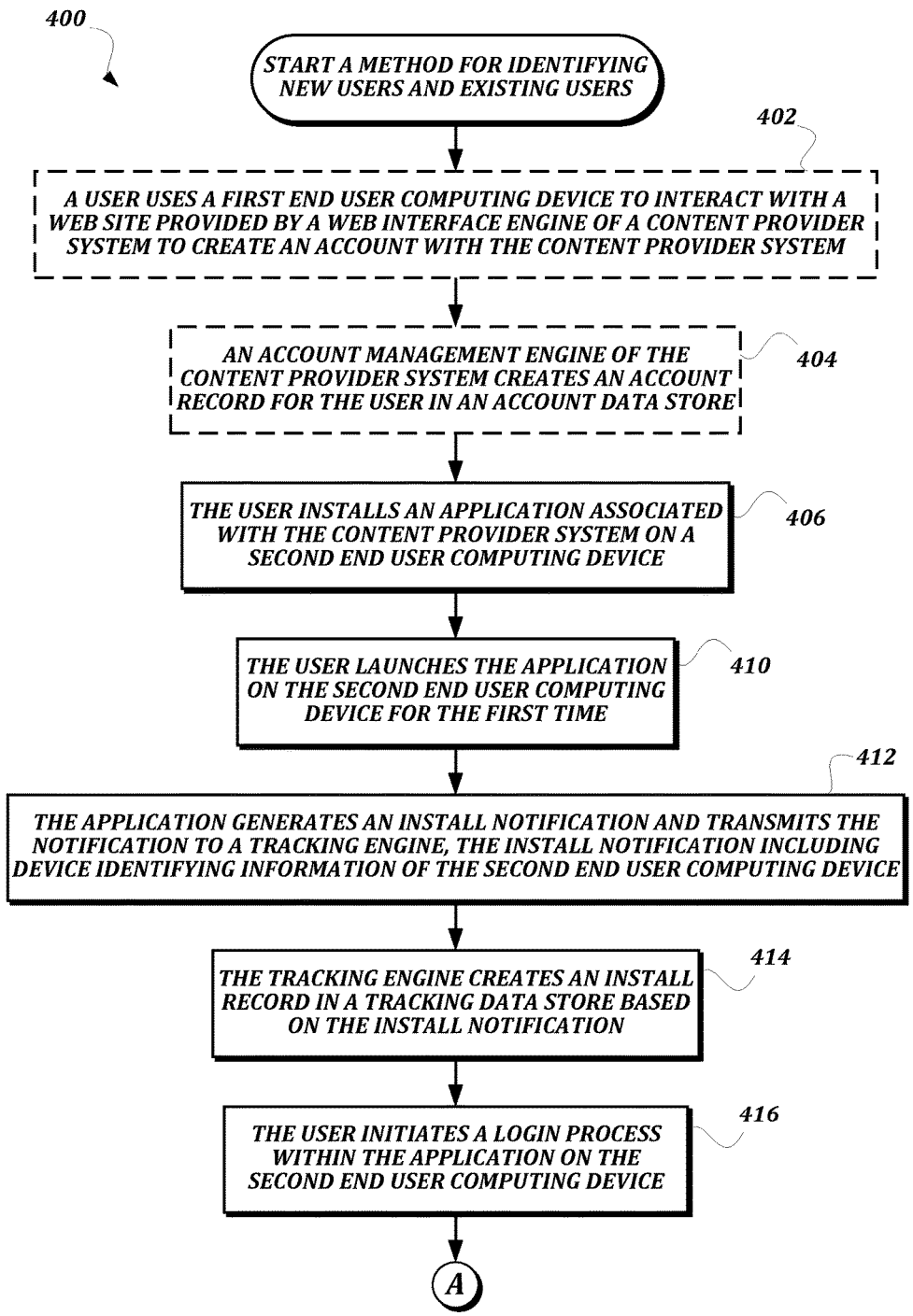
FIGS. 4A-4E are a flowchart that illustrates an exemplary embodiment of a method for identifying new users and existing users according to various aspects of the present disclosure.
Figure 4B:
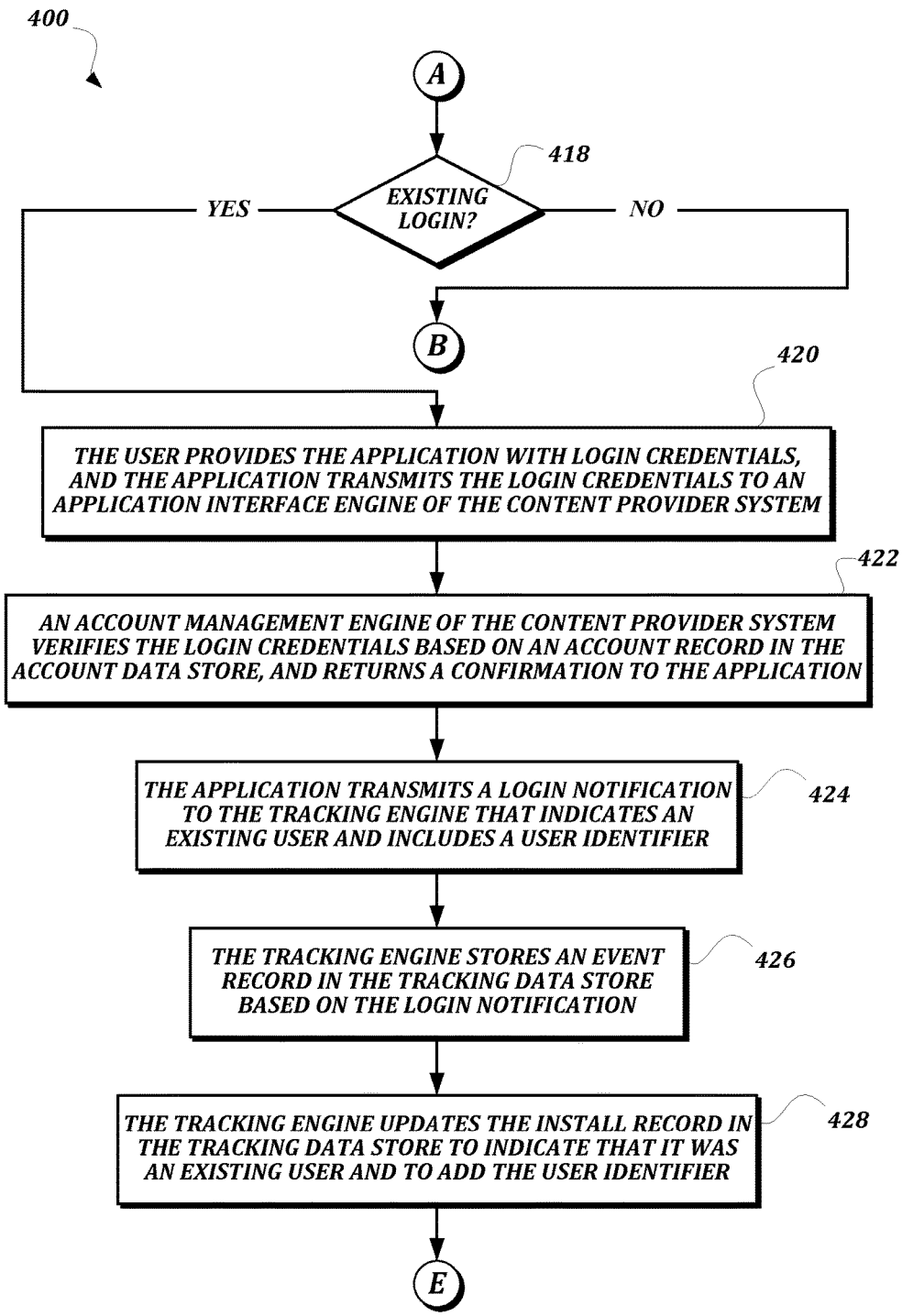
Figure 4C:
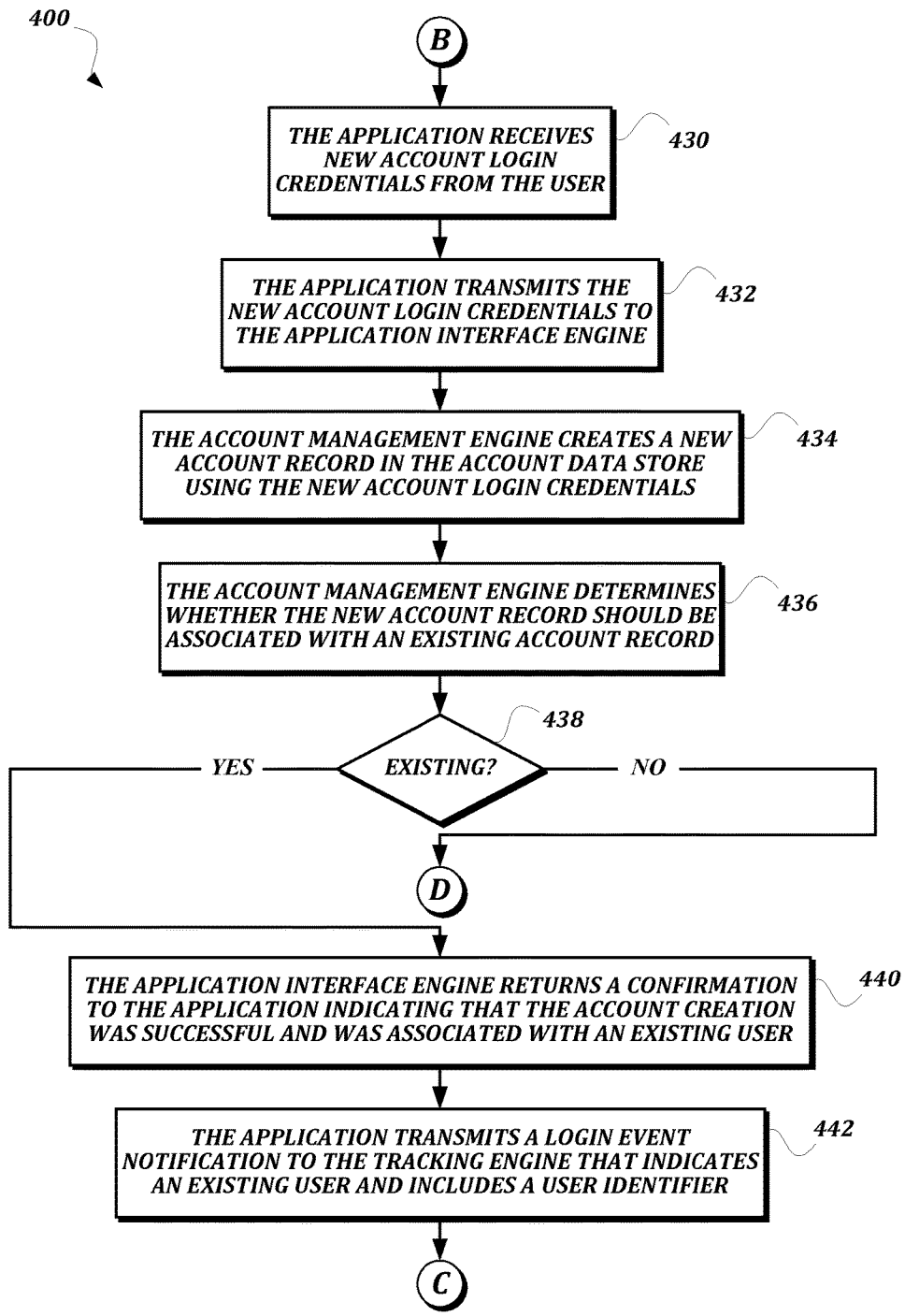
Figure 4D:
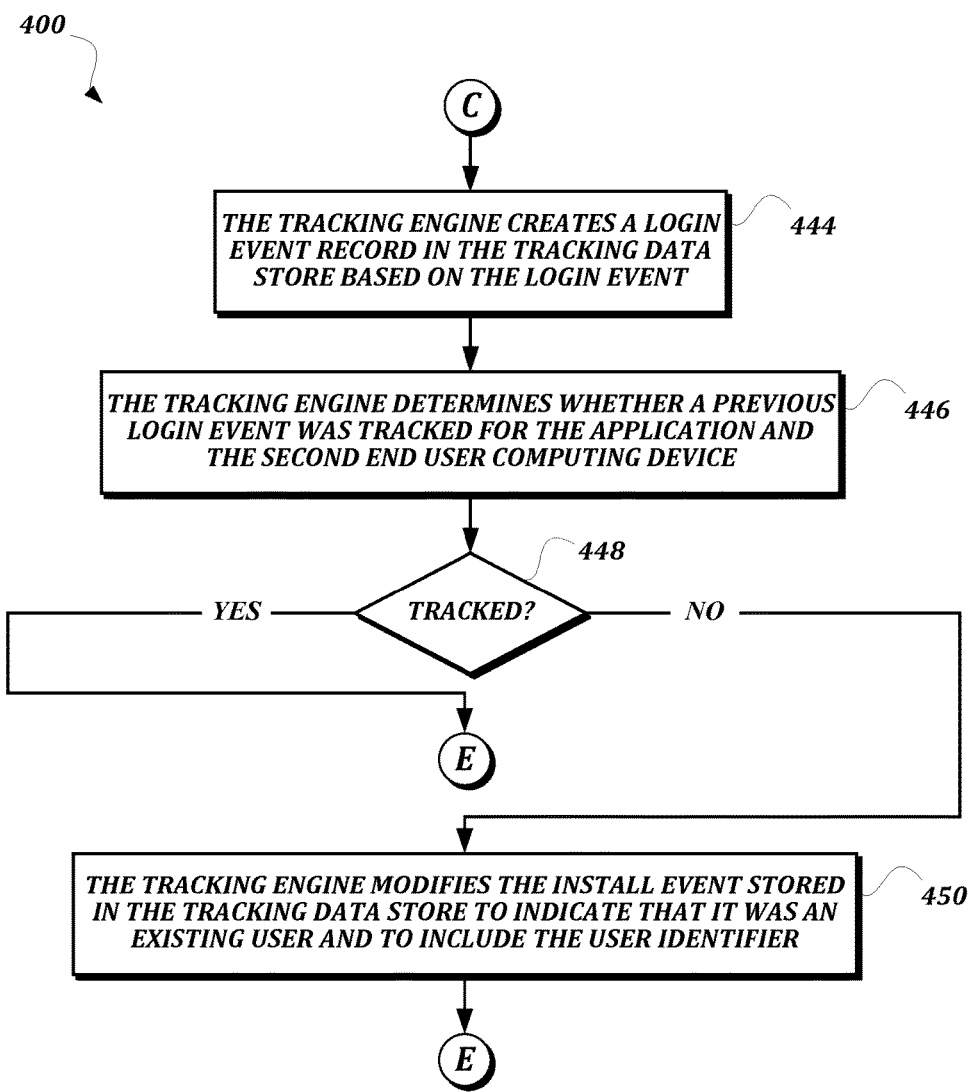
Figure 4E:
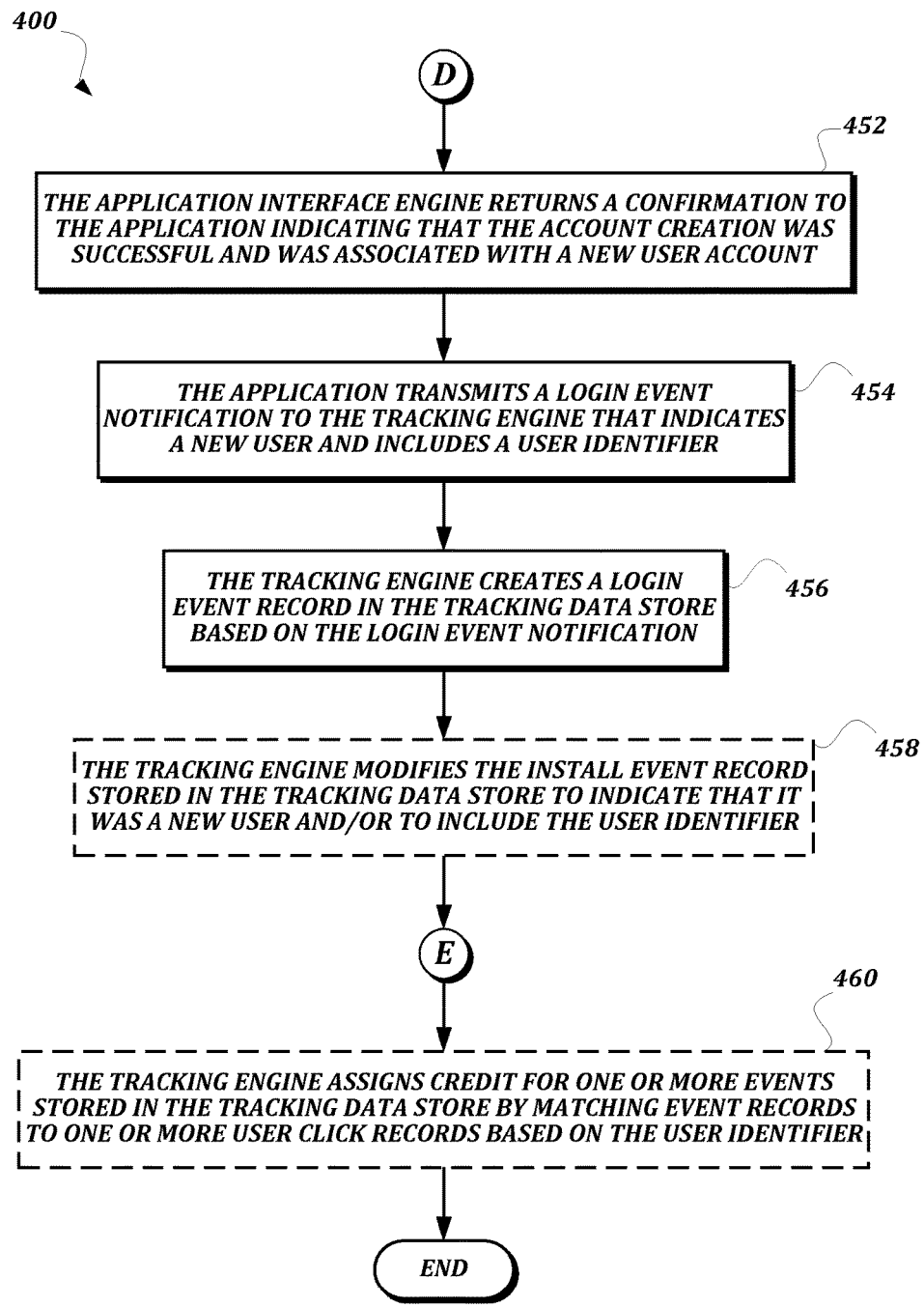

Identifying New Users Versus Existing Users and Providing Cross-Device Attribution FIGS. 3A and 3B are schematic diagrams that illustrate technical restrictions on communication that are overcome by embodiments of the present disclosure. In FIG. 3A, a web content provider 132 is shown. The web content provider 132 may be any type of advertiser/merchant 130 accessible over the network 100 from an end user computing device 162, but may typically be a retailer, a game provider, or some other content provider that maintains accounts for its users. The web content provider 132 provides at least one computing device 132A for generating and presenting one or more interfaces accessible by end user computing devices 162, and an account data store 135 for storing user account records for storing user information and controlling access to content. A user 90 establishes an account with the web content provider 132 using a first end user computing device 162B such as a desktop computer (or any other type of computing device). In some embodiments, this may occur by the user 90 accessing an account creation web interface provided by the web content provider computing device 132A via a web browser of the first end user computing device 162B. In some embodiments, the user 90 may also view and/or interact with one or more advertisements for the web content provider 132, and tracking information associated with the advertisements may be transmitted from the first end user computing device 162B to the tracking system 120. As described in further detail below, the tracking system 120 includes at least a tracking server 122A and a tracking data store 125. The dotted line between the web content provider 132 and the tracking system 120 indicates that there is no direct communication between the two systems.

In addition to web-accessible interfaces, many web content providers 132 also distribute applications through which their content may be accessed using, for example, smartphones or other mobile end user computing devices 162A. Web content providers 132 may advertise the applications in order to increase usage, and may use the tracking system 120 to analyze the effectiveness of such advertising. In FIG. 3B, some of the technical issues to be overcome in accurately tracking the performance of such advertising become apparent. The user 90 installs an application associated with the web content provider 130 on a second end user computing device 162A. The installation is reported to the tracking server 122A, and recorded in the tracking data store 125.

The web content provider 130 may wish to distinguish application installs from new users who did not previously have a relationship with the web content provider 130, versus existing users (such as user 90) who had already established a relationship via a first end user computing device 162B. Unfortunately, because there is no communication between the web content provider 130 and the tracking system 120, and there is no coordination or communication between the first end user computing device 162B and the second end user computing device 162A, traditional tracking systems 120 cannot provide such functionality. Also, advertisements that drove the installation of the application on the second end user computing device 162A may have been presented to the user 90 on the first end user computing device 162B. It is desirable to attribute the installation of the application to the publishers of such advertisements, but the lack of communication between the end user computing devices 162B, 162A and between the web content provider 130 and the tracking system 120 prevents such functionality. In some embodiments of the present disclosure, either (or both) of these goals may be accomplished.

Returning to FIG. 2A, in addition to the tracking system 120 described above, a content provider system 132, a first end user computing device 162B, and a second end user computing device 162C are also illustrated. The content provider system 132 includes one or more computing devices configured to provide a web interface engine 202 and an application interface engine 204. The web interface engine 202 is configured to generate a web interface to content and functionality provided by the content provider system 132, and to transmit the web interface to one or more end user computing devices for presentation to a user 90 by a standard web browser. The application interface engine 204 is configured to provide a programmatic interface to content and functionality provided by the content provider system 132. The content and functionality accessible via the programmatic interface provided by the application interface engine 204 is similar to the content and functionality accessible via the web interface provided by the web interface engine 202, but is accessed programmatically by, for example, an application developed by the content provider system 132 instead of by a standard web browser.

The content and functionality provided by the content provider system 132 may be accessible only to users who have registered with the content provider system 132 and thereby created a user account with the content provider system 132. Accordingly, the content provider system 132 also includes an account data store 135 and an account management engine 206. The account data store 135 is configured to store a plurality of user records, and the account management engine 206 is configured to create and manage the user records in the account data store 135 as well as to use the user records to process user login requests. Each user record includes a user identifier, such as a username, an email address, a social media login, and/or the like. Each user record may also include other information associated with the user, including but not limited to a mailing address, a billing address, payment account information (such as a payment account number or a portion thereof), a telephone number, and/or the like.

The first end user computing device 162B includes a web browser 208. The web browser 208 may include any web rendering technology capable of presenting the web interface generated by the web interface engine 202. In some embodiments, the web browser 208 may be a stand-alone web browser such as Internet Explorer, Google Chrome, Firefox, Opera, and/or the like. In some embodiments, the web browser 208 may be web rendering functionality that is included within another application executed by the first end user computing device 162B.

Figure 2B:
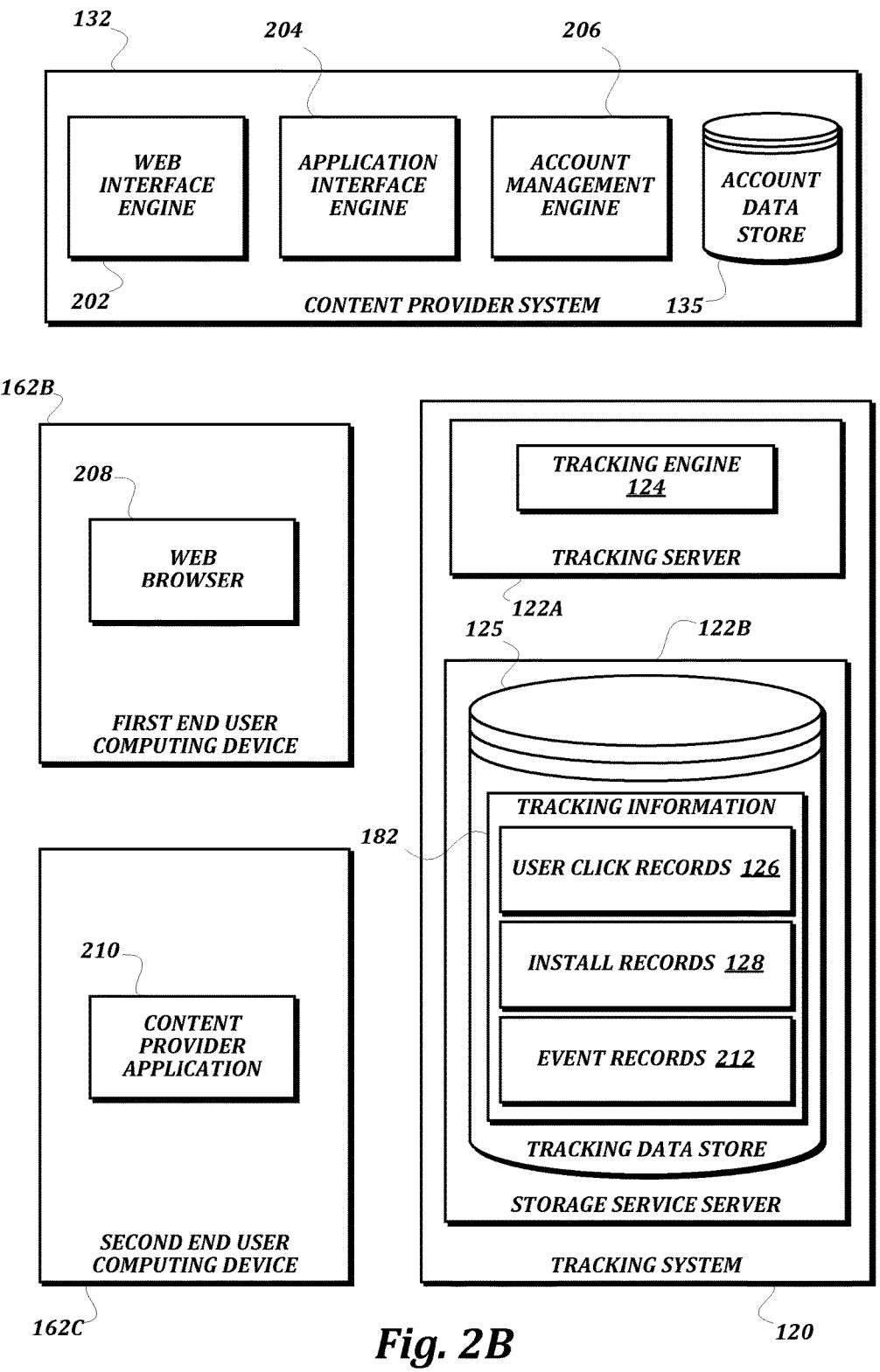

As illustrated in FIG. 2A, the second end user computing device 162C is currently missing an application associated with the content provider system 132. As such, FIG. 2A is similar to the situation illustrated in FIG. 3A, wherein only the first end user computing device 162B has been used to connect to the content provider system 132. FIG. 2B is a block diagram that illustrates an exemplary embodiment of a system wherein the second end user computing device 162C has installed the content provider application 210. As such, FIG. 2B is similar to the situation illustrated in FIG. 3B. The second end user computing device 162C may install the content provider application 210 using any suitable technique. For example, the second end user computing device 162C may obtain the content provider application 210 by accessing an application provider 170 such as the App Store provided by Apple, the Google Play store provided by Google, and/or the like directly on the second end user computing device 162C. As another example, the user 90 may use another end user computing device to cause the content provider application 210 to be added to an account associated with the second end user computing device 162C, thus causing the content provider application 210 to be pushed to the second end user computing device 162C by an application provider 170.

FIGS. 4A-4E are a flowchart that illustrates an exemplary embodiment of a method 400 for identifying new users and existing users according to various aspects of the present disclosure. From a start block, the method 400 proceeds to optional block 402, where a user 90 uses a first end user computing device 162B to interact with a web site provided by a web interface engine 202 of a content provider system 132 to create an account with the content provider system 132. While a first end user computing device 162B such as a desktop computing device is illustrated, one of ordinary skill in the art will recognize that the first end user computing device may be a smartphone 162A, a tablet 162C, or any other suitable computing device. At optional block 404, an account management engine 206 of the content provider system 132 creates an account record for the user 90 in an account data store 135. As described above, the account record includes at least a user identifier, and may additionally or instead include one or more of a payment account number, a mailing address, a billing address, a phone number, a password, and/or the like. Blocks 402 and 404 are optional within the method 400 for two reasons. First, the user 90 might be a new user who has not previously interacted with the content provider system 132 before the installation of the content provider application 210, and so there would not be a record stored in the account data store 135 before execution of the remainder of the method 400. Second, the account record might exist in the account data store 135 before the method 400 begins, and so blocks 402 and 404 would not be necessary.

The method 400 then proceeds to block 406, where the user 90 installs an application 210 associated with the content provider system 132 on a second end user computing device 162C. Though a second end user computing device 162C such as a mobile computing device or a tablet is illustrated, one of ordinary skill in the art will recognize that the second end user computing device 162C may be a smartphone, a desktop computing device, a laptop computing device, or any other suitable type of computing device. As discussed above, the installation of the application 210 may be via a computing device of an application provider 170. In some embodiments, the installation may have been encouraged by one or more advertisements on an end user computing device 162, for which impression records or user click records 126 may have been recorded in the tracking data store 125.

At block 410, the user 90 launches the content provider application 210 on the second end user computing device 162C for the first time. At block 412, the application 210 generates an install notification, and transmits the install notification to a tracking engine 124. The install notification includes device identifying information of the second end user computing device 162C. The device identifying information may include one or more of the device identifiers described above. At block 414, the tracking engine 124 creates an install record 128 in a tracking data store 125 based on the install notification. The install record 128 may include the device identifying information, the site ID or other information identifying the application 210, a timestamp, and/or any other appropriate information.

At block 416, the user 90 initiates a login process within the content provider application 210 on the second end user computing device 162C. The login process may include a user interface generated by the application 210, or a user interface generated on a remote computing device and presented by the application 210 on the second end user computing device 162C. In one example, the user interface may provide options to log in to an existing account by providing a user identifier (such as a username, an email address, an account number, and/or the like) and a password, or to create a new account. In some embodiments, instead of requesting a user identifier and a password, the login process may federate authentication to a third party using a technique such as OAuth, OpenID, and/or the like. In such embodiments, an identifier of the user provided by or associated with the third party may be used by the content provider system 132 as the user identifier, and authentication of the user will be performed by the third party.

The method 400 proceeds to a continuation terminal ("terminal A"), and from terminal A (FIG. 4B) to a decision block 418, where a determination is made regarding whether an interface for logging into an existing account or an interface for creating a new account was selected. If the interface for creating a new account was selected, then the result of the determination at decision block 418 is NO, and the method 400 proceeds to a continuation terminal ("terminal B").

Otherwise, the interface for logging into an existing account was selected, and so the result of the determination at decision block 418 is YES. Accordingly, the method 400 proceeds to block 420, where the user 90 provides the application 210 with login credentials, and the application 210 transmits the login credentials to an application interface engine 204 of the content provider system 132. As discussed above, the login credentials may include a username and password, a biometric identifier, an OAuth token, a certificate, or any other suitable proof of identity.

Next, at block 422, an account management engine 206 of the content provider system 132 verifies the login credentials based on an account record in the account data store 135, and returns a confirmation to the application 210. One of ordinary skill in the art will recognize that the method 400 as illustrated assumes that valid login credentials were provided, and that the method 400 will end or retry the authentication if valid login credentials were not provided. In embodiments wherein third-party authentication is used, the account management engine 206 may verify that the third-party authentication was successful and subsequently match the third-party account to the account referenced in the account record in the account data store 135.

The method 400 then proceeds to block 424, where the application 210 transmits a login notification to the tracking engine 124 that indicates an existing user and includes a user identifier of the user 90. The application 210 knows that it is an existing user because the login as processed by the content provider system 132 was successful. In some embodiments, the user identifier included in the login notification matches or otherwise corresponds to the user identifier that identifies the user 90 in the content provider system 132. At block 426, the tracking engine 124 stores an event record 212 in the tracking data store 125 based on the login notification. In some embodiments, the event record 212 includes an indication that the event was for an existing user. In some embodiments, the event record 212 also includes the user identifier. In some embodiments, the login notification is transmitted to the tracking engine 124 as an in-app event. Further details regarding in-app event tracking, logging, and attribution are provided in commonly owned, co-pending U.S. patent application Ser. No. 14/304,757, filed Jun. 13, 2014, the entire disclosure of which is hereby incorporated by reference herein for all purposes. At block 428, the tracking engine 124 updates the install record 128 in the tracking data store 125 to indicate that the install was associated with an existing user (as opposed to a new user), and to include the user identifier. The method 400 then proceeds to a continuation terminal ("terminal E").

If the new user creation interface was chosen and the result of the determination at decision block 418 was NO, then the method 400 proceeded to terminal B. From terminal B (FIG. 4C), the method 400 proceeds to block 430, where the application 210 receives new account login credentials from the user 90. At block 432, the application 210 transmits the new account login credentials to the application interface engine 204. The new account login credentials are similar to the account credentials described above. That is, the login credentials may include a username and password combination, a biometric identifier, and/or the like. In some embodiments, the login credentials may be provided and verified by a third party using a technique such as OAuth, OpenID, and/or the like, and the new account login credentials transmitted to the application interface engine 204 will include the result of the third party authentication process and/or the identity of the account at the third party authentication provider.

The method 400 then proceeds to block 434, where the account management engine 206 creates a new account record in the account data store 135 using the new account login credentials. If using a third party to authenticate the user 90, the creation of the new account record may be contingent upon successful authentication by the third party. Even if not using a third party authenticator, creation of the new account record may be contingent on the new account login credentials being valid (the identifier is not a duplicate of an existing identifier, the password meets various security requirements, and/or the like).

Even though the account record was newly created in the account data store 135, some embodiments of the method 400 do not assume that the newly created account record is not associated with an existing user account record. For example, in some embodiments, a given user 90 may create a first account via the web interface engine 202 using a first email address as a user identifier, and then may create a new account using the content provider application 210 with a different email address, a third-party account (instead of a username/password combination), and/or the like. Accordingly, at block 436, the account management engine 206 determines whether the new account record should be associated with an existing account record. To do so, the account management engine 206 may search for existing account records that match one or more items of information in the new account record, such as the contact email addresses (if not used as user identifiers), phone numbers, mailing addresses, billing addresses, payment account numbers, and/or the like.

The method 400 then proceeds to a decision block 438, where a test is performed based on the determination of whether the new account record should be associated with an existing account record. If the account management engine 206 found an existing account record to be associated with the new account record, then the result of the test at decision block 438 is YES, and the method 400 proceeds to block 440. At block 440, the application interface engine 204 returns a confirmation to the application 210 indicating that the account creation was successful and was associated with an existing user. In some embodiments, the confirmation may include the user identifier of the matching existing user account, which may remain different from the user identifier of the new user account. At block 442, the application 210 transmits a login event notification to the tracking engine 124 that indicates an existing user and includes a user identifier. In some embodiments, the login event notification may include the existing user identifier, the new user identifier, or both. The login event notification may also include the device identifying information and the site ID or other application identifying information. The method 400 then proceeds to a continuation terminal ("terminal C").

From terminal C (FIG. 4D), the method 400 proceeds to block 444, where the tracking engine 124 creates a login event record 212 in the tracking data store 125 based on the login event. The login event record 212 includes at least one of the new user identifier and the existing user identifier, and in some embodiments it may include both. In some embodiments, the login event record 212 also includes the device identifying information of the second end user computing device 162C and the site ID or other application identifying information identifying the content provider application 210. At block 446, the tracking engine 124 determines whether a previous login event was tracked for the application 210 and the second end user computing device 162C. This determination includes searching other login event records 212 for records having device identifying information and application identifying information that matches the new login event record 212 and having an earlier timestamp. The method 400 then proceeds to a decision block 448, where a test is performed based on the determination of whether a previous login event was tracked. If the determination was that a previous login event was tracked, then the result of the test at decision block 448 is YES, and the method 400 proceeds to a continuation terminal ("terminal E"). This causes the method 400 to skip further processing if a previous login event was tracked, thus helping to conserve processing resources that would be unnecessarily used to retrieve and update records.

Otherwise, if the determination is that a previous login event was not tracked, then the result of the test at decision block 448 is NO, and the method 400 proceeds to block 450. At block 450, the tracking engine 124 modifies the install event 128 stored in the tracking data store 125 that corresponds to the installation of the content provider application 210 to indicate that it was for an existing user and to include at least one of the existing user identifier and the new user identifier. The method 400 then proceeds to a continuation terminal ("terminal E").

Returning to decision block 438 (FIG. 4C), if the account management engine 206 does not find an existing account record that should be associated with the new account record, then the result of the test at decision block 438 is NO, and the method 400 proceeds to a continuation terminal ("terminal D"). From terminal D (FIG. 4E), the method 400 proceeds to block 452, where the application interface engine 204 returns a confirmation to the application 210 indicating that the account creation was successful and was associated with a new user account. Next, at block 454, the application 210 transmits a login event notification to the tracking engine 124 that indicates a new user and includes a user identifier. At block 456, the tracking engine 124 creates a login event record 212 in the tracking data store 125 based on the login event notification. In some embodiments, the login event record 212 may include an indication of being a new user, or may simply lack an indication that it is an existing user (thus allowing a new user default setting to persist). In some embodiments, the login event record 212 may also include the user identifier.

The method 400 then proceeds to optional block 458, where the tracking engine 124 modifies the install event record 128 stored in the tracking data store 125 to indicate that the install was associated with a new user and/or to include the user identifier. Block 458 is described as optional because in some embodiments, the install event record 212 may default to indicating a new user, and so an update to indicate a new user would be unnecessary. This default can help avoid computationally expensive database update operations that are unnecessary. Also, in some embodiments, the user identifier may not be added back to the install event record 128. The method 400 then proceeds to a continuation terminal ("terminal E").

From terminal E, the method 400 proceeds to optional block 460, where the tracking engine 124 assigns credit for one or more events stored in the tracking data store 125 by matching event records to one or more user click records 126 based on the user identifier. Block 460 is described as optional because some embodiments may not use the user identifier maintained by the content provider system 132 for attribution, but will instead only use the device identifying information and/or tracking identifiers assigned by the tracking system 120. In embodiments where the actions of block 460 are performed, the user identifier can be used by the tracking engine 124 to search for user click records 126 that occurred on devices other than the second end user computing device 162C that are associated with a matching user identifier (so, records that would not otherwise be matched using the device identifying information). Credit for ad providers associated with matching user click records 126 may then be provided by the tracking engine 124 in order to provide cross-device attribution. Techniques for providing attribution similar to those discussed in U.S. application Ser. No. 14/304,757, previously incorporated above, may be used by the tracking engine 124 for the matching user click records 126.

The method 400 then proceeds to an end block and terminates.

FIGS. 5A-5D are charts that illustrate examples of data that may be collected and stored by some embodiments of the tracking system 120 according to various aspects of the present disclosure. FIG. 5A illustrates data stored after receipt of an install notification representing the installation of an application 210. An install is recorded, and since no information has yet been received regarding whether the install was for an existing user of the content provider system 130, the record defaults to indicating that the install was for a new user.

FIG. 5B illustrates data stored in addition to the data illustrated in FIG. 5A, after receipt of a login event notification that indicates a new user. A login event is recorded, which also defaults to indicating that the install was for a new user.

FIG. 5C illustrates data stored by some embodiments of the present disclosure in addition to the data illustrated in FIG. 5A, after receipt of a login event notification that indicates an existing user. A login event is recorded, which also includes a flag indicating that the login event was for an existing user. In this illustrated embodiment, the install event is not updated with the new information (or has not yet been updated with the new information).

FIG. 5D illustrates data stored by some embodiments of the present disclosure in addition to the data illustrated in FIG. 5A, after receipt of a login event notification that indicates an existing user. A login event is recorded, which also includes a flag indicating that the login event was for an existing user. Further, the tracking engine 124 locates the install record associated with the installation of the application 210, and updates the install record to indicate that the install was for an existing user as well.

FIGS. 6A-6C are charts that illustrate examples of information provided in summary reports that may be generated by some embodiments of the tracking system 120 according to various aspects of the present disclosure. FIG. 6A illustrates an example report that includes a count of click records 126 and a count of install records 128 attributed to each of three different publishers. The report also includes totals of how many of each of the install records 128 were found to be associated with existing users of the content provider system 130 as opposed to install records 128 that were found to be associated with new users of the content provider system. FIG. 6B is an example report that presents similar information, but with the existing user install versus new user install information presented as a percentage of all installs instead of a raw value.

FIG. 6C illustrates a cohort report in which a revenue per install (RPI) value at 30 days and 60 days after install is presented for each publisher and for each type of install (new users vs. existing user). The RPI value may be determined if the application 210 submits in-application events to the tracking system 120 for events such as in-app purchases and/or other revenue-generating events within the application 210. This event information may then be combined with the new user versus existing user information to generate the cohort report. Such a report may be particularly valuable in determining which publishers are generating installs from valuable users. For example, as illustrated, Publisher Two has been shown to generate a large number of installs, but installs of the application 210 generated by Publisher Two have not led to a large amount of revenue per install. Meanwhile, installs generated by Publisher Three are more than twice as valuable as the installs generated by Publisher Two. Further, installs for existing users are shown to be more valuable than installs for new users, regardless of the publisher. This information can help the advertiser decide how to target future campaigns. It is important to note that while the summary reports in FIGS. 6A-6C appear simple, the technical challenge of collecting this information—which includes basing decisions on account information stored by the content provider system 130 and not made available to the tracking system 120, and may also include collecting and reconciling tracking information from multiple end user computing devices for a given user—is newly solved by embodiments of the present disclosure.

Detecting Multiple Users on a Single End User Computing Device

In some embodiments, the tracking system 120 may be further enhanced by placing the tracking information gathered for a given user in a user profile. This information and/or other information about the user, such as contact information, demographic information, behavior information, and/or the like, may be stored within the user profile. Such information is useful for targeting advertising to users that meet criteria established by an advertiser. For example, an advertiser may wish their advertisement to be displayed only to men between the ages of 18-34, or may wish their advertisement to be displayed only to users in a predetermined income bracket. Such information may also be useful for predicting user behavior. For example, preferences for a user may be predicted based on correlations between the users' profile and preferences of users with similar profiles. User profile information from a multitude of users may be processed to generate prediction models for predicting user behavior.

While this may be enabled by obtaining the user identifier used by the content provider system 132 to identify users, in some cases, the user identifier may not be available. As such, the device identifying information for a given end user computing device 162 may be used as a proxy for identifying the user/user profile. When collecting user profile information sorted by device identifying information to build prediction models, it is important to detect if multiple users share a device in order to determine the value of the user profile data in identifying the habits and/or demographic information of an individual (as opposed to more than one individual). While it may be rare for multiple users to share a device such as a mobile phone, it may be more common for multiple users to share other types of devices, such as tablet computing devices, smart televisions, game consoles, and/or the like. For example, if a parent and their child share a tablet computing device, tracking information may be obtained for both the parent's activity and the child's activity. If all of the tracked data for the parent and the child is combined into a single user profile, the contradictory use information may result in a poor prediction model for the parent, the child, or both. Further, the different users on the device may have very different monetization profiles. Returning to the parent and child example, the parent may be very desirable as a potential customer for many products for the home, while the child (who does not make purchasing decisions) may be less desirable. As another example, some advertisers may find additional value in presenting advertisements on devices that are shared by multiple users, as such ad presentations may have a natural viral factor to them (i.e., they may be presented to more than one user at once, such as in the case of the smart television).

What is desired are methods and systems for detecting when two or more users share a single device in order to allow the user profile information to be treated properly during the calculation of prediction models. Some existing systems, such as Netflix, address this problem by allowing users to set up multiple profiles within a single account, and then asking a user who is watching upon application startup. While effective, systems and methods that can automatically detect multiple users without the need for users to explicitly indicate that a device is shared or the identities of the users would be preferable.

In some embodiments, once a device is identified as being shared by more than one user, the tracking system 120 may split the event histories for each user in order to train separate predictors. In some embodiments, the tracking system 120 may choose to ignore data from shared devices while training predictors. In still other embodiments, the tracking system 120 may create and/or train predictors specifically for shared devices, and/or may use the fact that training data was obtained from a shared device in the feature vectors used for training.

In some embodiments, one or more of the following techniques may be used to identify multiple users on a single device:

A. Different app-specific user names on a single site or in a single app. For example, the tracking system 120 may receive multiple login event notifications from an application 210 installed on a given end user computing device 162 that have different user identifiers. The tracking system 120 may use the existence of multiple login event notifications or login event records 212 that share the same device identifying information and application identifying information but that have different user identifiers to determine that the device is used by more than one user.

B. Drastically different user names across multiple sites or applications. For example, the tracking system 120 may receive login event notifications from a first application and a second application both executed on a given end user computing device 162, and the login event notifications may include different user identifiers. If the tracking system 120 detects that the user identifiers are the same or similar (e.g., "nieksand" and "nsanders"), the tracking system 120 may determine that it is less likely that the device 162 is shared. However, if the tracking system 120 detects that the user identifiers are different (e.g., "sarah" and "bob"), the tracking system 120 may determine that it is more likely that the device 162 is shared.

C. Drastically different sites/applications installed on the same device. For example, the tracking system 120 may track an install of a violent adult-themed game on a given device 162, and may also track an install on the same device 162 of a game that helps children learn to count. In such a case, the tracking system 120 may determine that it is likely that the device 162 is shared, due to the low likelihood that the same user would be using the two applications targeted to mutually exclusive demographic groups.

D. Drastically different in-app behavior. In embodiments where in-application events are reported to the tracking system 120, if the tracking system 120 finds that some gameplay includes reported events performed at an "expert" level while intermittently the reported gameplay events are performed at a "novice" level, the tracking system 120 may treat this as a strong indicator of multiple users. Other in-app behavior reported to the tracking system 120, such as typing speed, error rates, and the like could be used in a similar way.

In some embodiments, one of these techniques is used. In some embodiments, a combination of two or more of these techniques (or similar techniques) may be used. In such embodiments, each separate technique may be used to determine a portion of a sharing likelihood score. The techniques may be weighted so that each technique contributes more or less than the other techniques to the overall sharing likelihood score.

The techniques discussed above may be performed by the tracking system 120 in any suitable order. For example, in some embodiments, the tracking system 120 may collect data from tracked devices 162 and may process the data to look for shared devices as part of a batch job. In some embodiments, the tracking system 120 may process a real time (or near-real time) data stream to detect shared devices. In some embodiments, results may be updated incrementally.

In some embodiments, the tracking system 120 may also support separating event notifications reported by a given end user computing device 162 into two or more streams, with one stream for each user of the shared device 162. Some techniques that may be used are:

A. Events may be separated based on a user identifier associated with the event, either in a single app or across apps.

B. Events may be separated based on an app category or demographic. For example, the adult games are provided as a first event stream, and the children's games are provided as a second event stream. (This technique may be useful even for devices that are not shared)

C. Events may be separated based on a level of skill or gameplay being exhibited at the time the event occurs.

In some embodiments, the tracking system 120 may include the information regarding whether event records in the tracking data store 125 are associated with a shared device or an unshared device directly in the associated event records. In some embodiments, the tracking system 120 may store separate records in the tracking data store 125 associated with each device, and may include the sharing status information in such records.

Computing Device

Figure 7:
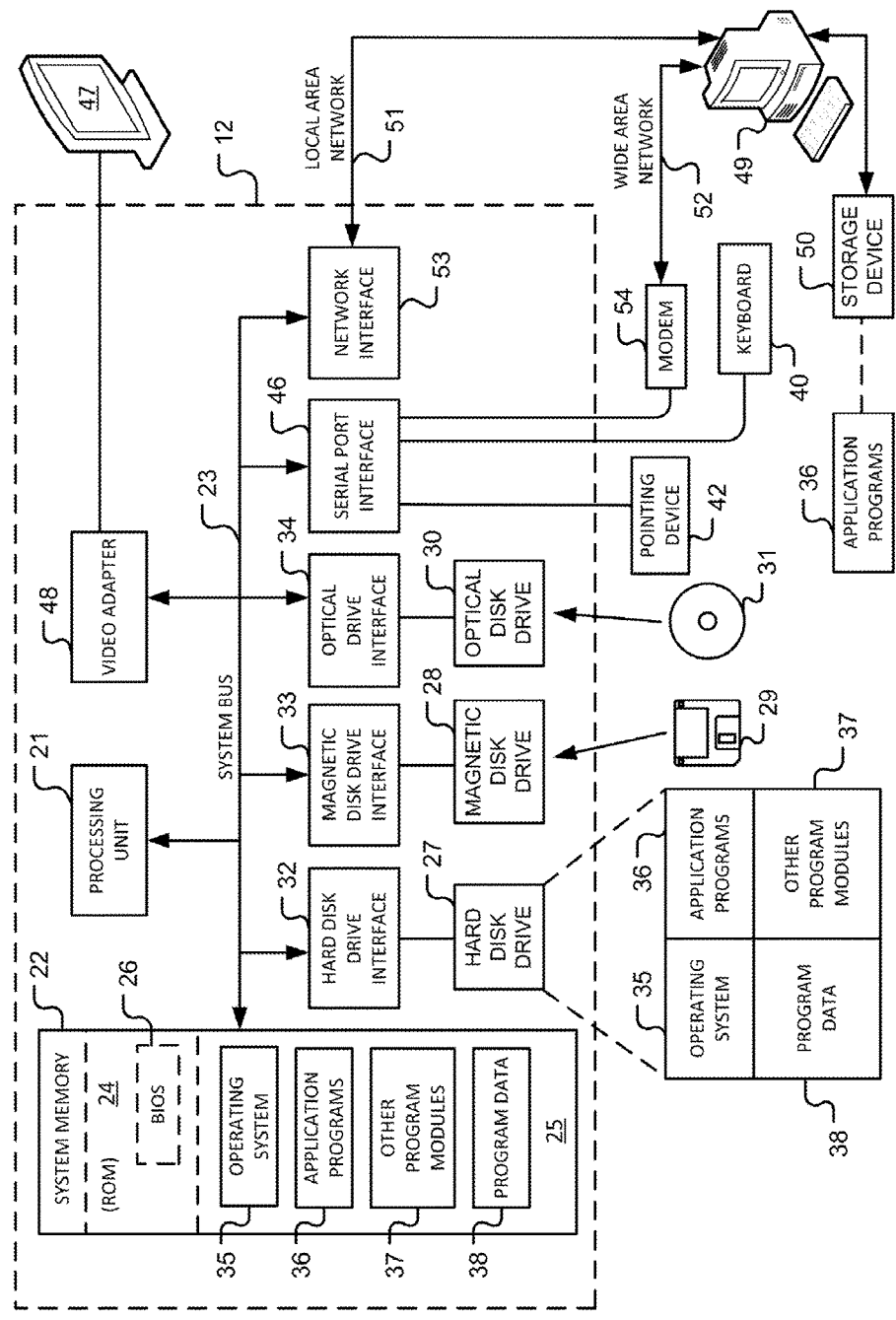
FIG. 7 is a diagram of hardware and an operating environment in conjunction with which implementations of the one or more computing devices of the system 100 may be practiced.

FIG. 7 is a diagram of hardware and an operating environment in conjunction with which implementations of the one or more computing devices of the system 100 may be practiced. The description of FIG. 7 is intended to provide a brief, general description of suitable computer hardware and a suitable computing environment in which implementations may be practiced. Although not required, implementations are described in the general context of computer-executable instructions, such as program modules, being executed by a computer, such as a personal computer.

Generally, program modules include routines, programs, objects, components, data structures, etc., that perform particular tasks or implement particular abstract data types.

Moreover, those skilled in the art will appreciate that implementations may be practiced with other computer system configurations, including hand-held devices, multi-processor systems, microprocessor-based or programmable consumer electronics, network PCs, minicomputers, mainframe computers, and the like. Implementations may also be practiced in distributed computing environments where tasks are performed by remote processing devices that are linked through a communications network. In a distributed computing environment, program modules may be located in both local and remote memory storage devices.

The exemplary hardware and operating environment of FIG. 7 includes a general-purpose computing device in the form of the computing device 12. Each of the computing devices of FIGS. 1, 2A, 2B, 3A, and 3B (including the computing devices 122, 132, 142, 152, 162, and 172) may represent computing devices such as the computing device 12 illustrated in FIG. 7. By way of non-limiting examples, the computing device 12 may be implemented as a laptop computer, a tablet computer, a web enabled television, a personal digital assistant, a game console, a smartphone, a mobile computing device, a cellular telephone, a desktop personal computer, and the like.

The computing device 12 includes a system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those skilled in the art that any type of computer-readable media which can store data that is accessible by a computer, such as magnetic cassettes, flash memory cards, solid state memory devices ("SSD"), USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including the operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). A monitor 47 or other type of display device is also connected to the system bus 23 via an interface, such as a video adapter 48. In addition to the monitor, computers typically include other peripheral output devices (not shown), such as speakers, printers, and haptic devices that provide tactile and/or other types of physical feedback (e.g., a force feedback game controller). The input devices described above are operable to receive user input and selections. Together the input and display devices may be described as providing a user interface.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 7 include a local-area network (LAN) 51 and a wide-area network (WAN) 52. Such networking environments are commonplace in offices, enterprise-wide computer networks, intranets and the Internet. The network 180 (see FIG. 1) may be implemented using one or more of the LAN 51 or the WAN 52 (e.g., the Internet).

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

In some embodiments, the system memory 22 stores computer executable instructions that when executed by one or more processors cause the one or more processors to perform all or portions of one or more of the methods (including the method 400 illustrated in FIGS. 4A-4E) described above. Such instructions may be stored on one or more non-transitory computer-readable media.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Accordingly, the invention is not limited except as by the appended claims.

The embodiments of the invention in which an exclusive property or privilege is claimed are defined as follows:

1. A system, comprising:
    a content provider system for providing digital content, the content provider system comprising an account data store configured to store a plurality of user account records;
    a tracking system comprising:
        a tracking data store configured to store a plurality of install records and a plurality of login event records; and
        at least one computing device configured to provide a tracking engine configured to create and update records stored in the tracking data store;
    a first end user computing device comprising a web browser, wherein the web browser is configured to access a web interface of the content provider system using a first user account associated with a first user account record of the plurality of user account records; and
    a second end user computing device comprising a content provider application, wherein the content provider application is configured to:
        transmit a registration request to the content provider system to create a new user account;
        receive a registration response from the content provider system, the registration response including an indication of whether the new user account is associated with the first user account;
        transmit a login event notification to the tracking engine, the login event notification including the indication of whether the new user account is associated with the first user account, wherein the tracking engine employs a sharing likelihood score for multiple users of the first end user computing device based on two or more actions that employ at least the login event notification to filter and match items of information, including identifying and tracking behaviors of new users of new user accounts with previously stored items of information, tracking different behaviors for existing users of existing user accounts that access the digital content provided by different publishers over the content provider system, identifying different user names employed to access the digital content provided by different publishers, or identifying different user names employed to access the digital content provided by a same publisher, wherein the sharing likelihood score provides the different publishers with an indication that multiple users are sharing a computing device without having to communicate with the computing device; and
        provide improved attribution for each of the different publishers that provides the accessed digital content by providing cross user computing device attribution based on the sharing likelihood score and records in the tracking data store that are created and updated separate from the content provider system, wherein the attribution improvement includes conserving computing resources by avoiding directly accessing the content provider system and avoiding employing cross-process or cross-application communication with any other user computing device.

2. The system of claim 1, wherein the content provider system further comprises: at least one computing device configured to provide a web interface to the digital content, wherein the web interface engine is configured to control access to the digital content based on user account records stored in the account data store; and at least one computing device configured to provide an application interface engine configured to provide programmatic access to the digital content, wherein the application interface engine is configured to control access to the digital content based on user account records stored in the account data store.

3. The system of claim 1, wherein the tracking engine is further configured to: receive an install notification from the second end user computing device, the install notification including device identifying information and application identifying information; and create an install record in the tracking data store based on the install notification.

4. The system of claim 3, wherein the tracking engine is further configured to: receive the login event notification from the second end user computing device; and create a login event record in the tracking data store based on the login event notification.

5. The system of claim 4, wherein the login event notification includes device identifying information, and wherein the tracking engine is further configured to, in response to determining that the login event notification indicates that the new user account is associated with the first user account: locate an associated install record in the tracking data store based on the device identifying information; and update the associated install record to indicate that the install was for an existing user.

6. The system of claim 5, wherein the login event notification includes a user identifier, and wherein updating the associated install record to indicate that the install was for an existing user includes adding the user identifier to the associated install record.

7. The system of claim 6, wherein the tracking engine is further configured to: match one or more user click records to the associated install record using the user identifier; and provide credit for the associated install record to one or more advertising providers identified in the matched one or more user click records.

8. The system of claim 1, wherein the content provider system further comprises at least one computing device configured to provide an account management engine, wherein the account management engine is configured to: receive the registration request to create the new user account; create a new user record in the account data store; determine whether the new user record should be associated with the first user account record associated with the first user account; and transmit the registration response to the end second end user computing device based on the determination of whether the new user record should be associated with the first user account record.

9. The system of claim 8, wherein determining whether the new user record should be associated with the first user account record includes: comparing one or more of an email address, a telephone number, a mailing address, a payment account number, and a billing address from the new user record to a corresponding item in the first user account record.

10. The system of claim 1, wherein the tracking system further includes at least one computing device configured to provide an interface engine configured to: provide an interface including one or more reports indicating a ratio of new user installs of the content provider application to existing user installs of the content provider application.

11. A computer-implemented method for a tracking system to use information from an account data store of a content provider system separate from the tracking system to determine whether a user registration within an application executing on a mobile computing device represents a new user or an existing user of the content provider system, the method comprising:
transmitting, by the mobile computing device, an account access request to the content provider system to access a user account using the application; receiving, by the mobile computing device, an account access response from the content provider system, wherein the account access response indicates whether the user account is associated with an existing account in the content provider system;
transmitting, by the application, a login event notification to the tracking system, the login event notification including the indication of whether the new user account is associated with the existing account, wherein the tracking system employs a sharing likelihood score for multiple users of the mobile computing device based on two or more actions that employ at least the login event notification to filter and match items of information, including identifying and tracking behaviors of new users of new user accounts with previously stored items of information, tracking different behaviors for existing users of existing user accounts that access the digital content provided by different publishers over the content provider system, identifying different user names employed to access the digital content provided by different publishers, or identifying different user names employed to access the digital content provided by a same publisher, wherein the sharing likelihood score provides the different publishers with an indication that multiple users are sharing the mobile computing device without having to communicate with the mobile computing device; and
providing, by the application, improved attribution for each of the different publishers that provides the accessed digital content by providing cross user computing device attribution based on the sharing likelihood score and records in a tracking data store that are created and updated separate from the content provider system, wherein the attribution improvement includes conserving computing resources by avoiding directly accessing the content provider system and avoiding employing cross-process or cross-application communication with any other mobile computing device.

12. The method of claim 11, further comprising: receiving, by the tracking system, the login event notification; and selectively updating, by the tracking system, one or more records in the tracking data store based on the login event notification.

13. The method of claim 12, further comprising: installing, by the mobile computing device, the application; transmitting, by the mobile computing device, an install notification to the tracking system; and creating, by the tracking system, an install record in the tracking data store based on the install notification; wherein selectively updating one or more records in the tracking data store based on the login event notification includes selectively updating the install record.

14. The method of claim 11, further comprising: receiving, by the tracking system, the login event notification; and in response to determining that the login event notification indicates an existing user, updating, by the tracking system, one or more records in a tracking data store to indicate the existing user status; otherwise, in response to determining that the login event notification indicates a new user, allowing, by the tracking system, a default user status in one or more records in the tracking data store to persist.

15. The method of claim 11, wherein transmitting an account access request includes: presenting, by the application, an existing account login prompt; and receiving, by the application, account login credentials from the user.

16. The method of claim 11, wherein transmitting an account access request includes: presenting, by the application, an account creation prompt; and receiving, by the application, new account login credentials from the user.

17. A non-transitory computer-readable medium having computer-executable instructions stored thereon that, in response to execution by one or more processors of a mobile computing device, cause the mobile computing device to:
transmit an install notification to a tracking system indicating that an application associated with a content provider system was installed, the install notification including device identifying information;
transmit, using the application, an account creation request to the content provider system to create a new user account within the content provider system;
receive an account creation response from the content provider system, wherein the response includes an indication of whether the new user account is associated with an existing user account;
transmit a login event notification to the tracking engine, the login event notification including the indication of whether the new user account is associated with the first user account, wherein the tracking engine employs a sharing likelihood score for multiple users of the first end user computing device based on two or more actions that employ at least the login event notification to filter and match items of information, including identifying and tracking behaviors of new users of new user accounts with previously stored items of information, tracking different behaviors for existing users of existing user accounts that access the digital content provided different publishers over the content provider system, identifying different user names employed to access the digital content provided by different publishers, or identifying different user names employed to access the digital content provided by a same publisher, wherein the sharing likelihood score provides the different publishers with an indication that multiple users are sharing a computing device without having to communicate with the computing device; and
provide, by the application, improved attribution for each of the different publishers that provides the accessed digital content by providing cross user computing device attribution based on the sharing likelihood score and records in a tracking data store that are created and updated separate from the content provider system, wherein the attribution improvement includes conserving computing resources by avoiding directly accessing the content provider system and avoiding employing cross-process or cross-application communication with any other mobile computing device.

18. The computer-readable medium of claim 17, wherein the mobile computing device is a smartphone.

19. The computer-readable medium of claim 17, wherein the account creation request includes login credentials.

20. The computer-readable medium of claim 19, wherein the account creation request includes one or more of an email address, a telephone number, a mailing address, a billing address, and a payment account number.

21. The computer-readable medium of claim 17, wherein the existing user account was established via a web-based interface separate from the application.

22. The computer-readable medium of claim 17, wherein the existing user account was established using a second computing device separate from the mobile computing device.

\* \* \* \* \*